(No Model.)

L. KALLING.
BOTTLE SEALING DEVICE.

No. 561,792. Patented June 9, 1896.

-WITNESSES-
Dan'l Fisher
Harry Constantine

-INVENTOR-
Lewis Kalling,
by Geo. W. T. Howard,
Atty.

UNITED STATES PATENT OFFICE.

LEWIS KALLING, OF BALTIMORE, MARYLAND.

BOTTLE-SEALING DEVICE.

SPECIFICATION forming part of Letters Patent No. 561,792, dated June 9, 1896.

Application filed December 14, 1895. Serial No. 572,166. (No model.)

*To all whom it may concern:*

Be it known that I, LEWIS KALLING, of the city of Baltimore and State of Maryland, have invented certain Improvements in Bottle-Sealing Devices, of which the following is a specification.

This invention relates to certain improvements in that class of bottle-sealing devices wherein a sealing-cap is applied to the outside of the bottle-head.

The said invention consists in the combination, with a bottle-head, of a cap having a hollow bead in its lateral or side wall, in which is inclosed a compressible gasket, the said cap being applied to the outside of the bottle-head and the bead thereof crushed or flattened onto the gasket to form a tight joint, substantially as hereinafter described.

In the further description of the said invention which follows reference is made to the accompanying drawings, forming a part hereof, and in which—

Figure 1:
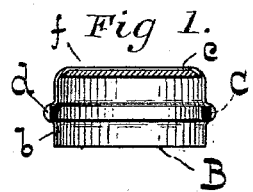
Figure 2:
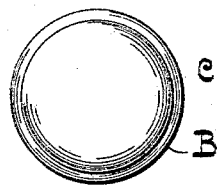
Figure 3:
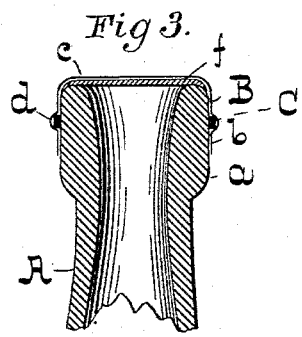
Figure 4:
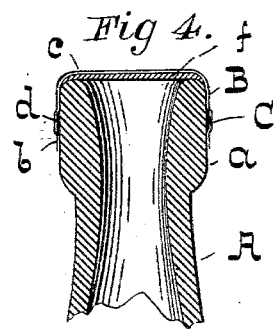
Figure 5:
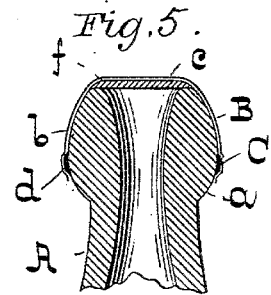

Figure 1 is a sectional side view of the improved cap in a condition for application to the bottle-head; Fig. 2, a top view of the same. Fig. 3 is a sectional view of the upper end of the bottle, together with the cap, before the formation of the joint. Fig. 4 is a view similar to Fig. 3, except that the joint is formed. Fig. 5 illustrates a modification in the invention, as hereinafter fully described.

Referring now to Figs. 1, 2, 3, and 4 of the drawings, A is the bottle, and *a* the head thereof. The head is shown as having a cylindrical exterior and devoid of any groove or depression in its surface.

B is the sealing-cap, which consists of the cylindrical wall *b* and the crown *c*. Within the wall *b* is formed an annular groove *d*, and the metal around the said groove, as seen from the outside of the cap, constitutes a bead.

C is a gasket, of rubber or any other similar substance, situated in the groove *d*. This gasket need not conform in shape to the groove, and while the groove is semicylindrical in cross-section the gasket may be a band of rectangular cross-section, as shown in Figs. 1 and 3.

To apply the cap containing the rubber-band gasket to the bottle-head and form a tight joint, the cap is placed over the head, and while it is held down, not necessarily with any pressure, the hollow bead *d* is flattened by the application to it of a tool or machine especially adapted for the purpose. After the flattening operation the bead and the inclosed gasket appear as shown in Fig. 4, wherein the gasket is compressed and entirely fills the hollow flattened bead.

In Figs. 1, 3, and 4 I show a disk *f*, of cork or some other substance of similar character, situated between the crown of the cap and the end of the bottle-head. This disk is not intended to make a joint in any sense of the word, as the joint is formed entirely by the flattening of the hollow bead upon the gasket, which is thus brought closely in contact with and compressed against the outer surface of the bottle-head, but as a means to protect, to some extent, the inner surface of the crown of the cap from contact with the contents of the bottle. In other words, it is used merely as a waterproof coating for the metallic cap, and its use may be dispensed with entirely without affecting the utility of the cap or the joint formed as described.

In Fig. 5 the bottle-head is nearly spherical, or of the shape commonly found in bottles used to hold malt liquors under gas-pressure. In this case the joint is formed at or slightly below the part of the head which has the greatest diameter.

I claim as my invention—

In combination with a bottle-head, a cap to fit over the same, having a hollow bead in its side or lateral wall, and a gasket situated in the hollow bead or between the lateral wall of the cap and the exterior surface of the bottle-head, the said bead being crushed or flattened onto the gasket so as to distort its original shape and thereby form a tight joint, substantially as specified.

LEWIS KALLING.

Witnesses:
WM. T. HOWARD,
DANL. FISHER.